United States Patent
Dragon et al.

(10) Patent No.: US 9,209,661 B2
(45) Date of Patent: Dec. 8, 2015

(54) ELECTRIC MACHINE INCLUDING A HOUSING HAVING MATERIALLY INTEGRALLY FORMED COOLANT CHANNELS AND AN OUTER SLEEVE

(71) Applicants: Andrew Dragon, Fishers, IN (US); Colin Hamer, Noblesville, IN (US)

(72) Inventors: Andrew Dragon, Fishers, IN (US); Colin Hamer, Noblesville, IN (US)

(73) Assignee: REMY TECHNOLOGIES, L.L.C., Pendleton, IN (US)

( * ) Notice: Subject to any disclaimer, the term of this patent is extended or adjusted under 35 U.S.C. 154(b) by 528 days.

(21) Appl. No.: 13/633,614

(22) Filed: Oct. 2, 2012

(65) Prior Publication Data

US 2014/0091652 A1  Apr. 3, 2014

(51) Int. Cl.
| | | |
|---|---|---|
| H02K 9/20 | (2006.01) | |
| H02K 5/00 | (2006.01) | |
| H02K 5/20 | (2006.01) | |
| H02K 5/15 | (2006.01) | |
| H02K 5/22 | (2006.01) | |
| H02K 5/18 | (2006.01) | |

(52) U.S. Cl.
CPC .. *H02K 5/20* (2013.01); *H02K 5/15* (2013.01); *H02K 5/225* (2013.01); *H02K 5/18* (2013.01)

(58) Field of Classification Search
CPC ............. H02K 5/20; H02K 5/18; H02K 5/15; H02K 5/225; H02K 5/04; H02K 5/10; H02K 11/0073
USPC ................................................ 310/89, 52–64
See application file for complete search history.

(56) References Cited

U.S. PATENT DOCUMENTS

| | | | |
|---|---|---|---|
| 3,531,668 A * | 9/1970 | Cathey | 310/58 |
| 5,331,238 A * | 7/1994 | Johnsen | 310/58 |
| 6,909,210 B1 * | 6/2005 | Bostwick | 310/52 |
| 6,997,687 B2 * | 2/2006 | Iritani | 417/371 |
| 7,322,103 B2 * | 1/2008 | Burjes et al. | 29/890.035 |
| 2008/0309174 A1 | 12/2008 | Jockel | |
| 2009/0079278 A1 | 3/2009 | Kramer et al. | |
| 2010/0001597 A1 * | 1/2010 | Noll | 310/58 |
| 2012/0013217 A1 | 1/2012 | Bradfield | |
| 2012/0080964 A1 | 4/2012 | Bradfield | |
| 2012/0080965 A1 | 4/2012 | Bradfield | |
| 2012/0119602 A1 | 5/2012 | Himmelmann | |
| 2013/0259720 A1 | 10/2013 | Mills et al. | |

FOREIGN PATENT DOCUMENTS

FR  2817406 A1 *  5/2002
JP  2003324901 A  11/2003

OTHER PUBLICATIONS

FR 2817406 A1 machine translation Jan. 27, 2015.*
International Search Report and Written Opinion for PCT Application No. PCT/US2013/061544, dated Jan. 28, 2014, pp. 1-10.

* cited by examiner

Primary Examiner — Dang Le
Assistant Examiner — Leda Pham
(74) Attorney, Agent, or Firm — Cantor Colburn LLP

(57) ABSTRACT

An electric machine housing includes a housing body having an outer surface provided with a plurality of materially integrally formed ribs defining a plurality of coolant channels. Each of the plurality of materially integrally formed ribs has an outer surface portion. A sleeve is provided on the housing body extending about the outer surface. The sleeve has an inner surface section that is matingly engaged with the outer surface portion of each of the materially integrally formed ribs.

15 Claims, 3 Drawing Sheets

ELECTRIC MACHINE INCLUDING A HOUSING HAVING MATERIALLY INTEGRALLY FORMED COOLANT CHANNELS AND AN OUTER SLEEVE

BACKGROUND OF THE INVENTION

Exemplary embodiments pertain to the art of electric machines and, more particularly, to an electric machine including a housing having materially integrally formed coolant channels and an outer sleeve.

Electric machines generally include a housing that encloses a rotor and a stator. The rotor typically includes a rotor hub. The rotor hub is joined to a shaft that is supported by one or more bearings. The rotor hub supports a plurality of rotor windings that, when acted upon by a magnetic field generated by the stator, cause the rotor to rotate. In some cases, the rotor will include laminations that support permanent magnets. The permanent magnets also interact with the magnetic field supplied by the stator causing the rotor to rotate. Many electric machines guide a coolant through the housing to absorb heat from the rotor and/or the stator. The coolant may take the form of a fluid flow including both gases and liquid. Coolant may be supplied directly to internal portions of the housing, passed directly through the stator or, in some cases, through passages formed in the housing.

BRIEF DESCRIPTION OF THE INVENTION

Disclosed is an electric machine housing including a housing body having an outer surface provided with a plurality of materially integrally formed ribs defining a plurality of coolant channels. Each of the plurality of materially integrally formed ribs has an outer surface portion. A sleeve is provided on the housing body extending about the outer surface. The sleeve has an inner surface section that is matingly engaged with the outer surface portion of each of the materially integrally formed ribs.

Also disclosed is an electric machine including a housing body having an inner surface and an outer surface provided with a plurality of materially integrally formed ribs defining a plurality of coolant channels. Each of the plurality of materially integrally formed ribs has an outer surface portion. A stator is fixedly mounted to the inner surface of the housing. A rotor is rotatably mounted relative to the stator in the housing, and a sleeve is provided on the housing body extending about the outer surface. The sleeve has an inner surface section that is matingly engaged with the outer surface portion of each of the materially integrally formed ribs.

Further disclosed is a method of cooling an electric machine housing. The method includes materially integrally forming a plurality of ribs having an outer surface portion on an outer surface of an electric machine housing. The plurality of ribs establish a plurality of coolant channels. The method also includes positioning a sleeve having an inner surface section about the electric machine housing, and thermally expanding the electric machine housing into the sleeve. The outer surface portion of one or more of the plurality of ribs is compressed against the inner surface section of the sleeve. A coolant is flowed through the plurality of coolant channels to cool the electric machine housing.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
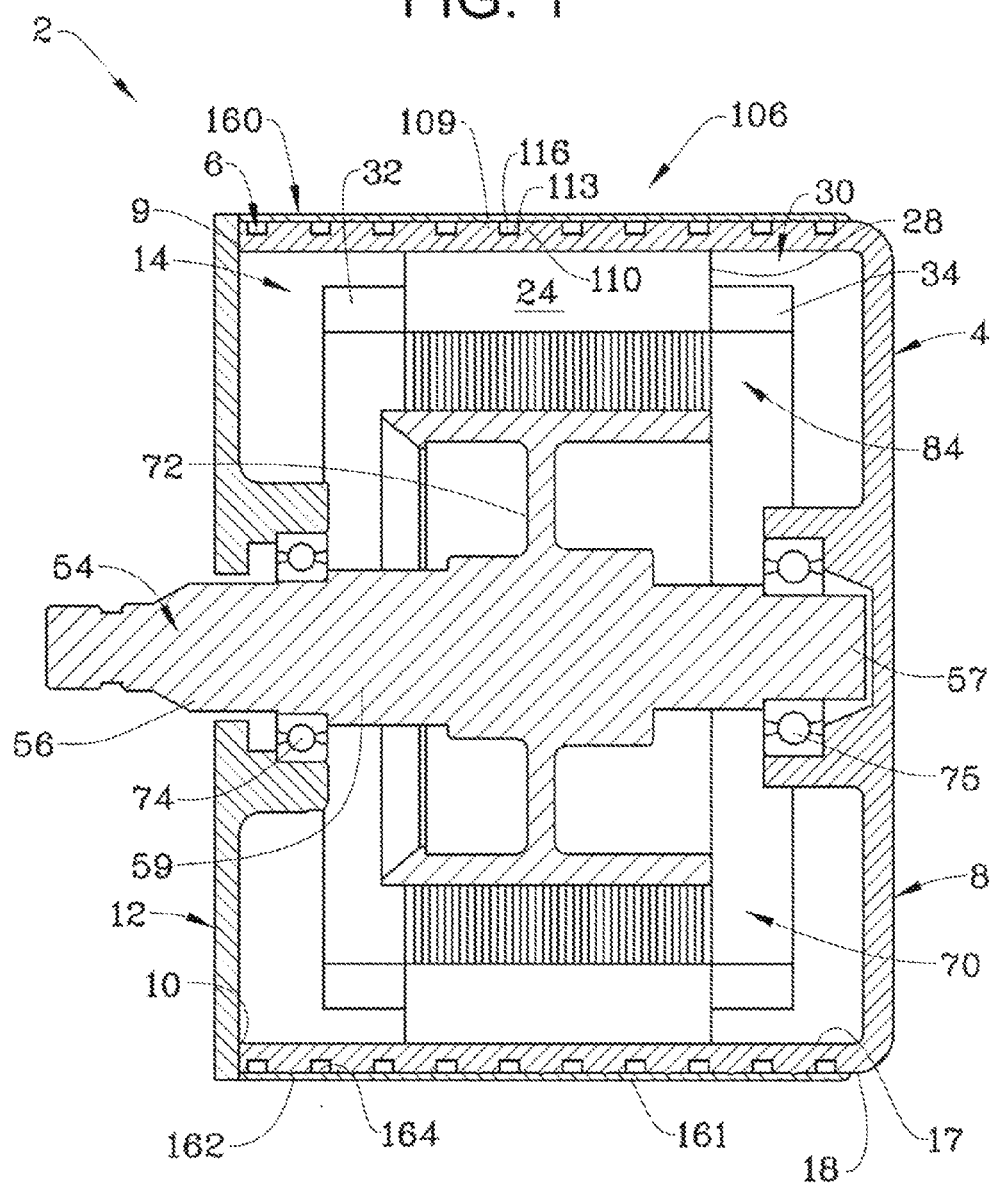
FIG. 1 depicts a cross-sectional side view of an electric machine including a housing having materially integrally formed coolant channels and an outer sleeve in accordance with an exemplary embodiment.

A permanent magnet electric machine in accordance with an exemplary embodiment is indicated generally at 2 in FIG. 1. Electric machine 2 includes a housing 4 having an annular side wall 6 that extends from a first end wall 8 to a cantilevered end 9 defining an opening 10. A second end wall or cover 12 is coupled to cantilevered end 9 and extends across opening 10. Annular side wall 6, first end wall 8 and cover 12 collectively define an interior portion 14. Annular side wall 6 includes an inner surface 17 and an outer surface 18. Housing 4 is formed from a material that may be readily die-cast and possesses a relatively high coefficient of thermal expansion (CTE). For example, housing 4 may be formed from aluminum, brass, magnesium and/or alloys thereof. Of course, other materials may also be employed. At this point it should be understood that annular side wall 6 may take on many geometries and should not be considered to be limited to being circular. Electric machine 2 is further shown to include a stator 24 arranged on inner surface 17. Stator 24 includes a body or stator core 28 that supports a plurality of stator windings 30 having a first end turn portion 32 and a second end turn portion 34.

Electric machine 2 is also shown to include a shaft 54 rotatably supported within housing 4. Shaft 54 includes a first end 56 that extends to a second end 57 through an intermediate portion 59. Shaft 54 supports a rotor assembly 70. Rotor assembly 70 includes a rotor hub 72 mounted to intermediate portion 59. A first bearing 74 supports first end 56 relative to second end wall or cover 12, and a second bearing 75 supports second end 57 relative to first end wall 8. Rotor assembly 70 includes a lamination assembly 84 that supports a plurality of magnets (not shown). At this point it should be understood that while shown as having ends supported on opposite sides of housing 4, shaft 54 may be supported at a single end such that rotor hub 72 is cantilevered. Also, while described as having laminations, rotor 70 may be provided with windings.

In accordance with an exemplary embodiment, housing 4 includes a plurality of materially integrally formed ribs 106. Plurality of ribs 106 are, in accordance with an exemplary embodiment, die-cast with housing 4. However, ribs 106 may also be formed through a machining process. Plurality of ribs 106 include, for example, a first rib 109 and a second rib 110. Ribs 109 and 110 are spaced one from another through a base portion 113. A plurality of coolant channels, one of which is indicated at 116, is defined between adjacent ones of the plurality of ribs 106. Coolant channels 116 include a surface contour 120 that enhances heat exchange between housing 4 and a coolant (not shown). Surface contour 120 is shown in the form of a plurality of ridges 124 provided on base portion 113.

Figure 2:
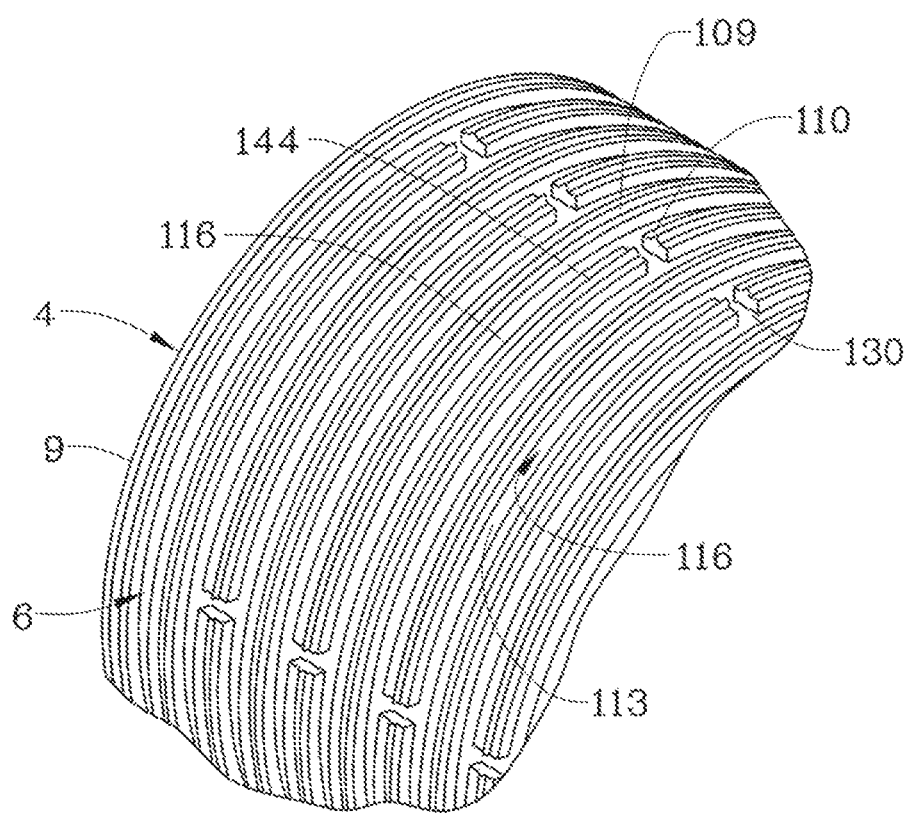
FIG. 2 depicts a perspective view of the housing of FIG. 1 without the outer sleeve illustrating connections between adjacent ones of the coolant channels in accordance with an aspect of the exemplary embodiment.

As shown in FIG. 2, each of the plurality of ribs 106 includes a plurality of interruption zones, one of which is shown at 130 on second rib 110. Interruption zones 130 establish a fluidic connection between the plurality of coolant channels 116. As also shown in FIG. 2, interruption zones 130 are off-set relative to one another so as to form a serpentine flow path (not separately labeled) over outer surface 18 of housing 4. The serpentine flow path allows coolant to flow from an inlet (not shown) provided at, for example, first end wall 8, to flow to an outlet (also not shown) provided at, for example, cantilevered end 9. The serpentine flow path creates a flow of coolant that covers outer surface 18 substantially entirely to remove heat conducted from interior portion 14.

Figure 3:
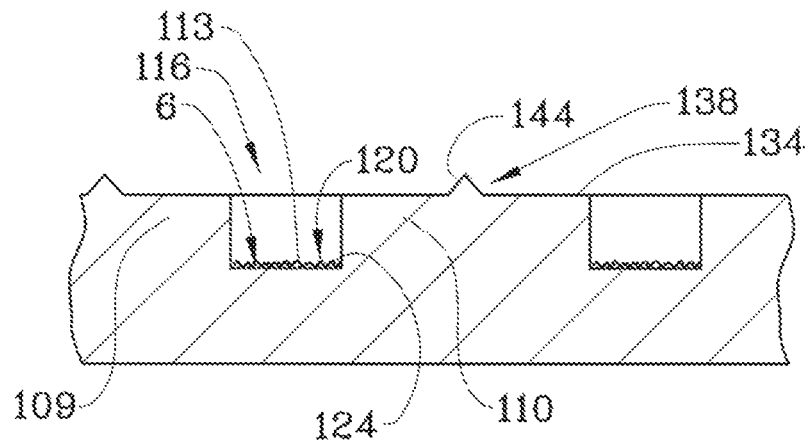
FIG. 3 depicts a cross-sectional detail view of an annular rib provided on a wall defining one of the coolant channels of FIG. 1 without the outer sleeve in accordance with another aspect of the exemplary embodiment.

As shown in FIG. 3, each of the plurality of ribs 106 includes an outer surface portion 134 provided with an annular rib or seal 138. Annular seal 138 takes the form of a yield concentration ridge 144 configured to yield or deform when subjected to a compressive force. In further accordance with the exemplary embodiment, electric machine 2 is provided with an annular sleeve 160 extending about housing 4. Sleeve 160 includes a sleeve body 161 having an outer surface section 162 and an inner surface section 164. Inner surface section 164 is configured to cooperate with outer surface portion 134, and annular seal 138 to provide a sealed cover (not separately labeled) across the plurality of coolant channels 116 creating a plurality of coolant passages (also not separately labeled) extending about housing 4. The sealed cover ensures that fluid communication between adjacent coolant channels/passages remains substantially entirely through interruption zones 130.

Figure 4:
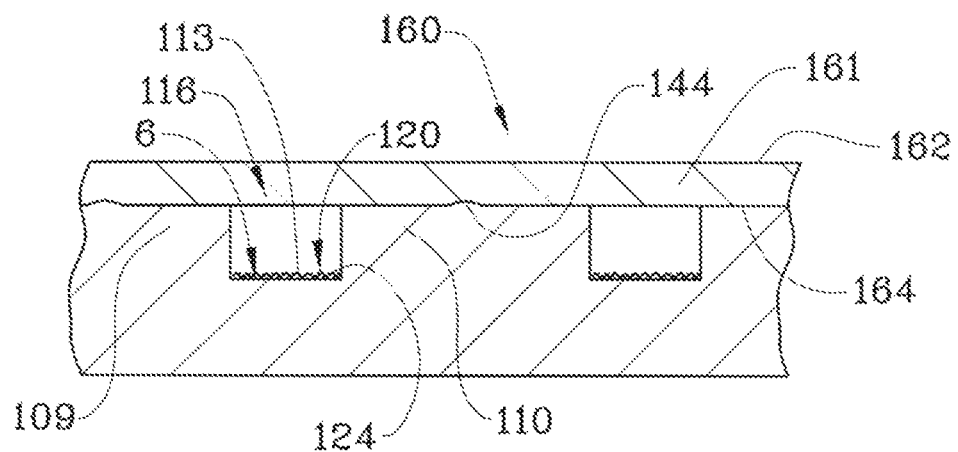
FIG. 4 depicts a cross-sectional detail view of the annular rib having been deformed by the outer sleeve to form a seal between adjacent coolant channels in accordance with yet another aspect of the exemplary embodiment.

In still further accordance with an exemplary embodiment, sleeve 160 is formed from a material having a relatively low CTE, such as, for example, steel. In accordance with an aspect of the exemplary embodiment, the CTE of sleeve 160 may closely approximate the CTE of stator core 28. The mismatch between the CTE of housing 4 and the CTE of sleeve 160 creates a mechanical bond between the two components. More specifically, during operation, housing 4 will heat and expand at a first rate that is higher than any rate of expansion of sleeve 160. Expansion of housing 4 will be constrained by sleeve 160 creating a compressive force between the outer surface portion 134 of ribs 106 and inner surface section 164. The compressive force causes annular seal 138 to deform establishing a seal between the outer surface portions 134 of ribs 106 and inner surface section 164 of sleeve 160 as shown in FIG. 4.

At this point it should be understood that the exemplary embodiments describe an electric machine housing having integrally formed ribs that, when joined with a sleeve form coolant passages. The coolant passages guide a coolant about the housing that absorbs heat conducted from interior portion. The housing and sleeve are formed from materials having substantially different coefficients of thermal expansion. In this manner, thermal expansion of the housing is contained by the sleeve to form a seal. In accordance with an aspect of an exemplary embodiment, thermal expansion of the housing also leads to deformation of sealing or yield concentration ridges provided on an outer surface of the ribs. It should also be understood that while examples of materials for both the housing and the sleeve have been provided, other materials may also be employed.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof Therefore, it is intended that the invention not be limited to the particular embodiment disclosed as the best mode contemplated for carrying out this invention, but that the invention will include all embodiments falling within the scope of the claims.

What is claimed is:

1. An electric machine housing comprising:
   a housing body including an outer surface having a plurality of materially integrally formed ribs defining a plurality of coolant channels, each of the plurality of materially integrally formed ribs having an outer surface portion;
   an annular seal provided on the outer surface portion of each of the plurality of ribs, the annular seal comprising a yield concentration ridge configured and disposed to yield into the sleeve upon thermal expansion of the housing to establish a seal between adjacent ones of the plurality of coolant channels; and
   a sleeve provided on the housing body extending about the outer surface, the sleeve having an inner surface section that is matingly engaged with the outer surface portion of each of the materially integrally formed ribs, wherein the housing body is formed from a first material having a first coefficient of thermal expansion and the sleeve is formed from a second material having a second coefficient of thermal expansion that is lower than the first coefficient of thermal expansion.

2. The electric machine housing according to claim 1, wherein each of the plurality of coolant channels include a base portion extending between adjacent ones of the plurality of materially integrally formed ribs, the base portion including a surface contour configured and disposed to enhance heat transfer between the housing body and a coolant flowing through the plurality of coolant channels.

3. The electric machine housing according to claim 2, wherein the surface contour comprises a plurality of ridges.

4. The electric machine housing according to claim 1, wherein one or more of the plurality of ribs includes an interruption zone that establishes a fluidic connection between adjacent ones of the plurality of coolant channels.

5. The electric machine housing according to claim 4, wherein at least two of the plurality of ribs include interruption zones, the interruption zones being off-set relative to one another and fluidically connecting adjacent ones of the plurality of coolant channels forming a serpentine coolant flow path across the outer surface.

6. The electric machine housing according to claim 1, wherein the first material comprises one of aluminum, zinc, brass and magnesium and the second material comprises steel.

7. The electric machine housing according to claim 1, wherein the annular seal is materially integrally formed with the outer surface of each of the plurality of ribs.

8. An electric machine comprising:
   a housing body including an inner surface and an outer surface having a plurality of materially integrally formed ribs defining a plurality of coolant channels, each of the plurality of materially integrally formed ribs having an outer surface portion;

an annular seal provided on the outer surface portion of each of the plurality of ribs, the annular seal comprising a yield concentration ridge configured and disposed to yield into the sleeve upon thermal expansion of the housing to establish a seal between adjacent ones of the plurality of coolant channels;

a stator fixedly mounted to the inner surface of the housing;

a rotor rotatably mounted relative to the stator in the housing; and a sleeve provided on the housing body and extending about the outer surface, the sleeve having an inner surface section that is matingly engaged with the outer surface portion of each of the materially integrally formed ribs, wherein the housing body is formed from a first material having a first coefficient of thermal expansion and the sleeve is formed from a second material having a second coefficient of thermal expansion that is lower than the first coefficient of thermal expansion.

9. The electric machine according to claim 8, wherein each of the plurality of coolant channels include a base portion extending between adjacent ones of the plurality of materially integrally formed ribs, the base portion including a plurality of ridges configured and disposed to enhance heat transfer between the housing body and a coolant flowing through the plurality of coolant channels.

10. The electric machine according to claim 8, wherein one or more of the plurality of ribs includes an interruption zone that establishes a fluidic connection between adjacent ones of the plurality of coolant channels.

11. The electric machine housing according to claim 10, wherein at least two of the plurality of ribs include interruption zones, the interruption zones being off-set relative to one another and fluidically connecting adjacent ones of the plurality of coolant channels forming a serpentine coolant flow path across the outer surface.

12. The electric machine housing according to claim 1, wherein the first material comprises one of aluminum, zinc, brass and magnesium and the second material comprises steel.

13. The electric machine according to claim 8, wherein the annular seal is materially integrally formed with the outer surface of each of the plurality of ribs.

14. A method of cooling an electric machine housing, the method comprising:

materially integrally forming a plurality of ribs having an outer surface portion on an outer surface of an electric machine housing formed from a first material having a first coefficient of thermal expansion, the plurality of ribs establishing a plurality of coolant channels;

positioning a sleeve having an inner surface section about the electric machine housing, the sleeve being formed from a second material having a second coefficient of thermal expansion that is lower than the first coefficient of thermal expansion;

thermally expanding the electric machine housing into the sleeve deforming an annular seal provided on the outer surface portion of each of the plurality of ribs, compressing the outer surface portion of one or more of the plurality of ribs against the inner surface section of the sleeve; and flowing a coolant through the plurality of coolant channels to cool the electric machine housing.

15. The method of claim 14, further comprising: fluidically connecting adjacent one or more of the plurality of coolant channels forming a serpentine coolant flow path across the electric machine housing.

* * * * *